(12) United States Patent
Cupples

(10) Patent No.: US 7,190,323 B2
(45) Date of Patent: Mar. 13, 2007

(54) INTEGRAL SEALED ANTENNA MOUNT FOR CELLULAR BASED MONITORS

(75) Inventor: Kenneth Alan Cupples, Knoxville, TN (US)

(73) Assignee: Robertshaw Controls Company, Richmond, VA (US)

( * ) Notice: Subject to any disclaimer, the term of this patent is extended or adjusted under 35 U.S.C. 154(b) by 10 days.

(21) Appl. No.: 11/200,336

(22) Filed: Aug. 9, 2005

(65) Prior Publication Data

US 2006/0033673 A1 Feb. 16, 2006

Related U.S. Application Data

(60) Provisional application No. 60/600,349, filed on Aug. 10, 2004.

(51) Int. Cl.
*H01Q 1/12* (2006.01)

(52) U.S. Cl. ............ 343/878; 343/888; 343/906; 73/290 R

(58) Field of Classification Search ............ 343/878, 343/906, 888; 73/290 R
See application file for complete search history.

(56) References Cited

U.S. PATENT DOCUMENTS 5,877,663 A * 3/1999 Palan et al. ............ 333/252
6,097,346 A * 8/2000 Fehrenbach et al. ........ 343/785

* cited by examiner

*Primary Examiner*—Hoang V. Nguyen
(74) *Attorney, Agent, or Firm*—Reinhart Boerner Van Deuren P.C.

(57) ABSTRACT

A tank monitoring apparatus, having an externally protruding antenna, has the externally protruding antenna to a monitor housing with a liquid-tight compression fitting which provides a fluid-tight seal between the antenna and the housing.

18 Claims, 2 Drawing Sheets

INTEGRAL SEALED ANTENNA MOUNT FOR CELLULAR BASED MONITORS

CROSS-REFERENCE TO RELATED PATENT APPLICATIONS

This patent application claims the benefit of U.S. Provisional Patent Application No. 60/600,349, filed Aug. 10, 2004, the entire teachings and disclosure of which are hereby incorporated in their entireties by reference thereto.

FIELD OF THE INVENTION

This invention relates to monitoring of fluid in remote storage tanks, and more particularly to a tank monitoring apparatus having an externally projecting antenna for wireless transmission of data from the tank monitoring apparatus.

BACKGROUND OF THE INVENTION

Fluid such as gasoline, propane, fertilizer, chemicals, fuel oil, and the like are often stored in tanks located in remote areas. It is desirable, and known, to equip such remote storage tanks with monitoring equipment having the capability of detecting fluid level, or changes in fluid level, in the tank, and reporting this information to a person, or data collection center located some distance from the tank.

Some monitoring devices, used for this purpose, include an externally protruding antenna, for transmitting data gathered by the monitoring device wirelessly through the antenna.

The construction of such tank monitors is often required, by applicable government regulations, and environmental conditions, to be fluid-tight. In some prior monitoring devices having a projecting wireless antenna, the antenna is mounted on and sealed to a housing, using potting-type compounds. The use of such potting-type compounds is undesirable in that, over time, the compounds tend to degrade, leading to loss of the fluid-type integrity of the monitoring device, and in some cases the necessity of premature replacement of the monitoring device. In addition, the use of such potting-type compounds tends to drive up the cost of development and production of the monitoring device, due to the necessity of performing extensive qualification testing on the device, to demonstrate compliance with applicable government regulations, additional complexity and time required for curing, etc., of the compound during manufacture, and quality control testing of the potted joint during manufacture.

It is desirable to provide an improved monitoring device having an externally protruding antenna, for use with remote tanks containing fluids, such as those listed above, which meets applicable government regulations, while overcoming one or more of the problems described above.

BRIEF SUMMARY OF THE INVENTION

The invention provides an improved tank monitoring apparatus, having an externally protruding antenna, by attaching the externally protruding antenna to a monitor housing with a liquid-tight compression fitting which provides a fluid-tight seal between the antenna and the housing.

In one form of the invention, a tank monitor apparatus, having an externally protruding antenna, includes a housing and a liquid-tight compression fitting attached to the housing. The housing includes a peripheral wall defining an enclosed interior cavity, of the monitor, having an antenna opening therein for passage therethrough of the antenna. The liquid-tight compression fitting is attached to the housing at the antenna opening for providing a fluid-tight seal between the antenna and the housing.

A tank monitor apparatus, according to the invention, may further include the antenna.

A liquid-tight compression fitting, in a tank monitor apparatus according to the invention, may be attached to the housing by a threaded connection. The compression fitting may include first and second elements thereof forming a threaded connection with one another for applying a compressive force to the antenna, as the first and second elements are threaded together, to thereby retain the antenna in the compression fitting and form a fluid-tight seal. The liquid-tight compression fitting may include a body, a compression cap, and a seal insert. The seal insert may have a through-hole therein adapted for extension therethrough of the antenna and applying a compressive force to the antenna when a compressive force is applied to the seal insert. The body may have a retention portion thereof attached to the housing. The body also defines a through-bore therein for passage of the antenna therethrough, with a section of the through-bore being configured as a seal insert cavity for receiving and retention therein of the seal insert. The body and compression cap may be adapted for fixed attachment to one another in a manner applying compressive force to the seal insert, to thereby cause the seal insert to apply a corresponding compressive force to the antenna for retaining the antenna and forming a fluid-tight seal between the antenna and the housing.

The body of the compression fitting, in a monitor apparatus according to the invention, may further include a threaded retention section thereof, adapted for passage through the antenna opening in the housing. A tank monitor apparatus, according to the invention, may further include a fitting retention nut, and a housing seal disposed about the threaded retention section of the body. The fitting retention nut may be configured for threadably engaging the retention portion of the body and bearing against the housing, adjacent the antenna opening, for retaining the fitting and the antenna opening and compressing the housing seal between the body of the fitting and the housing, to thereby seal a juncture of the fitting and housing. The fitting retention nut may be disposed inside of the interior cavity of the housing, with the housing seal being disposed outside of the interior cavity.

The invention may also be practiced in the form of a method for constructing a tank monitor apparatus, according to the invention.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
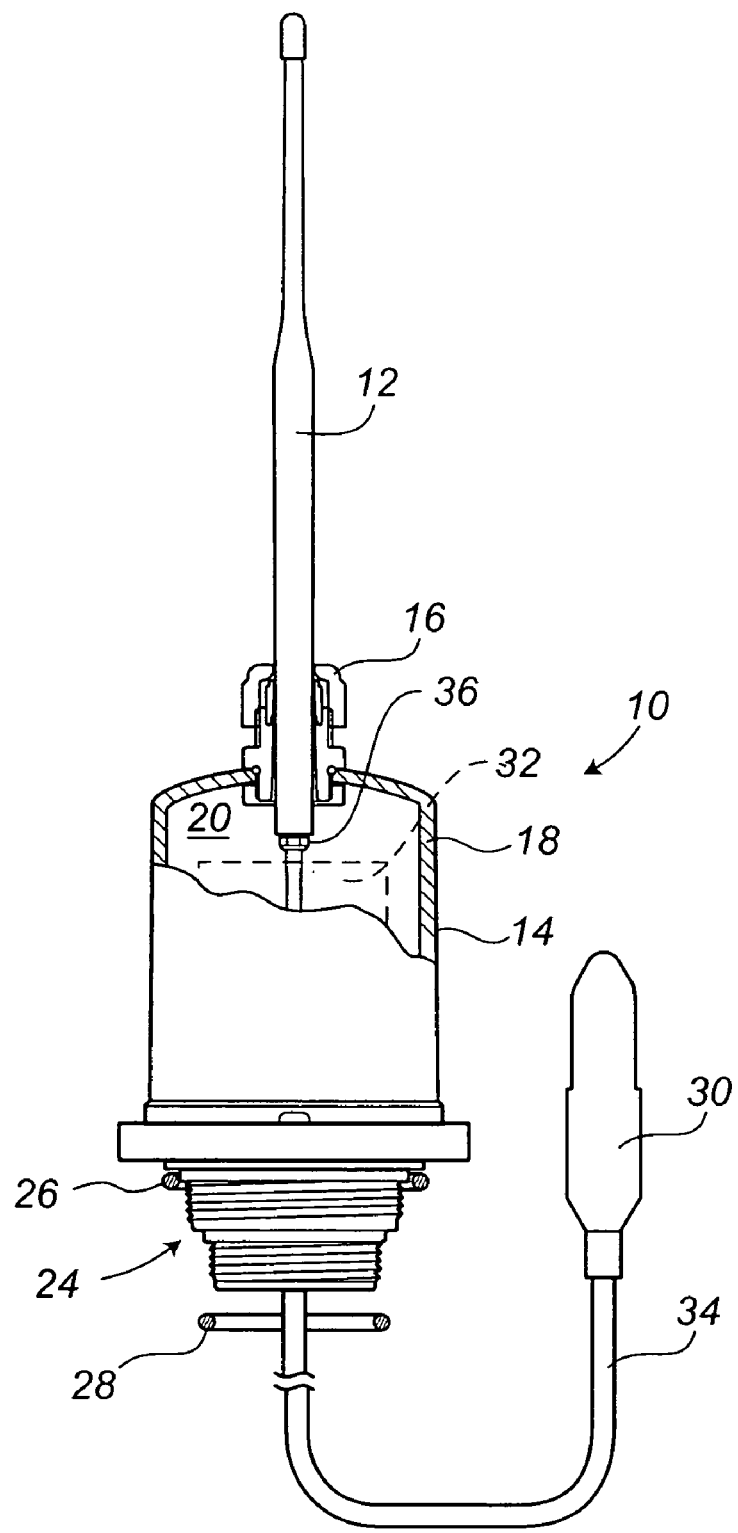
FIG. 1 is a partial cross-section of an exemplary embodiment of a tank monitoring apparatus, according to the invention.

FIG. 1 shows a first exemplary embodiment of a tank monitor apparatus 10, according to the invention, having an externally protruding antenna 12 joined to a housing 14 of the tank monitor apparatus 10, by a liquid-tight compression fitting 16.

The housing 14 includes a peripheral wall 18 defining an enclosed interior cavity 20 having an antenna opening 22 (best seen in FIG. 2) therein, for passage therethrough of the antenna 12. The compression fitting 16 is attached to the housing 14 at the antenna opening 22, in the manner described in more detail below, for providing a fluid-tight seal between the antenna 12 and the housing 14.

As shown in FIG. 1, the housing 14 of the exemplary embodiment of the monitor 10 includes a threaded portion 24, thereof, adapted for mounting the monitor 10 onto a tank (not shown) through either a 2" or a 1.5" diameter bung-hole in the tank. The juncture between the monitor 10 and the tank is sealed with either a large diameter O-ring 26, or a smaller diameter O-ring 28, depending upon the diameter of the bung-hole in the tank.

The exemplary embodiment of the tank monitoring apparatus 10 includes a pressure sensor 30 which is connected to circuit elements 32, located within the internal cavity 20 of the housing 14, by an umbilical cord 34. The umbilical cord has an appropriate length, for example, 12 to 20 feet, which will allow the pressure sensor 30 to rest on, or very near to the bottom of the tank. The pressure sensor 30, in the exemplary embodiment of the tank monitor apparatus 10, provides and electrical signal to the internal circuitry 32 which is indicative of the fluid pressure at the bottom of the tank. As the level of fluid in the tank changes, the pressure at the bottom of the tank also changes, thereby also allowing the electronic circuitry 32 to monitor not only the level of fluid in the tank, but the rate at which the fluid level is increasing or decreasing.

The antenna 12, of the exemplary embodiment, is a one-piece molded antenna, of the type used in wireless and cellular communication, having a screw connection 36 at one end thereof, which is located within, and connected to the internal circuitry 32, within the internal cavity 20 of the housing 14, as illustrated in FIG. 1. Such antennas are available from Centurion Wireless Technologies, Inc. of Lincoln, Nebr., USA.

Figure 2:
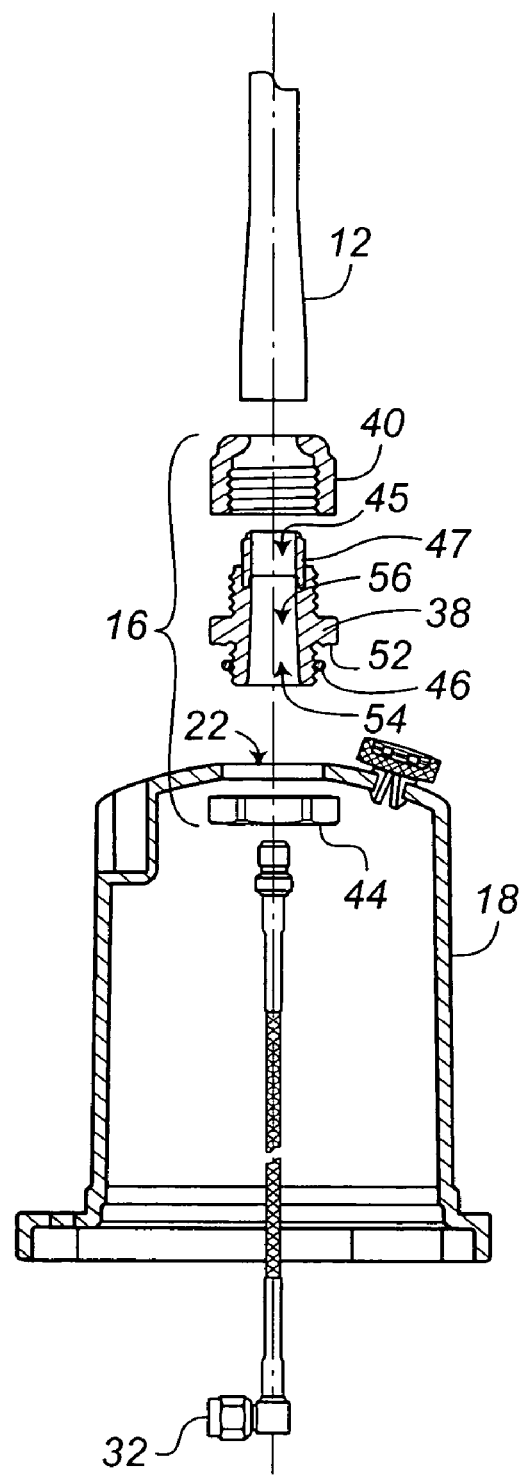
FIG. 2 is an exploded, partial cross-sectional view, of a portion of the exemplary embodiment shown in FIG. 1, illustrating the manner in which a projecting antenna is connected to a housing of the exemplary embodiment, utilizing a liquid-tight compression fitting.

As shown in FIG. 2, the compression fitting 16, in the exemplary embodiment of the invention, includes a body 38, a compression cap 40, a seal insert 42, a fitting retention nut 44 and a housing seal, in the form of an O-ring 46.

In the exemplary embodiment, the seal insert 42 is formed of a Buna-N material, and includes a through-hole 48 adapted for sliding receipt therein of the antenna 12. In other embodiments of the invention, it will be recognized that the seal insert 42 may be fabricated from other appropriate materials, such as Viton. The size of the through-hole 48, and the composition of the material from which the seal insert 42 is made, are selected such that when a compressive force is applied to the seal insert 42, the seal insert 42 will tightly grip the antenna 12, to form a fluid-tight seal.

The body 38 of the compression fitting 16 includes a threaded retention portion 50 thereof, sized to pass through the antenna opening 22 in the housing 14. The body 38, of the compression fitting 16, is fixedly attached to the housing 14 by threading the fitting retention nut 44 onto the threaded retention portion 50 of the body 38, and tightening the fitting retention nut 44 against an inner surface of the peripheral wall 18 of the housing 14. The body 38 further includes an external hex portion 52 thereof which is tightened against an exterior surface of the peripheral wall 18 of the housing 14, as the fitting retention nut 44 is drawn up against the interior surface of the housing 14. The external hex portion 52 includes a recess, or annular groove, therein, for receipt of the O-ring 46, such that the O-ring 46 is clamped between the external hex portion 52 of the body 38 of the compression fitting 16 when the fitting retention nut 44 is drawn up tightly against the interior surface of the housing 14, in such a manner that the O-ring 46 is compressed to provide a fluid-tight seal between the body 38 of the compression fitting 16 and the housing 14.

The body 38 of the compression fitting 16 also defines a through-bore 54 therein, for passage of the antenna 12. A section of the through-bore 54 is configured as a seal insert cavity 56 for receiving and retention therein of the seal insert 42.

The body 38 and compression cap 40 are mutually configured for threaded attachment to one another, in such a manner that a compressive force is exerted on the seal insert 42, as the compression cap 40 is threaded onto the body 38, with the compressive force generated in the seal insert 42 applying a corresponding compressive force on the antenna 12 to thereby retain the antenna 12 in the compression fitting and form a fluid-tight seal between the antenna, and the compressive fitting 16.

Those having skill in the art, will recognize that, although in the exemplary embodiment of the tank monitor apparatus 10, the compression cap 40 is located on the outside of the housing 14 and the fitting retention nut 44 is located on the inside of the housing 14, in other embodiments of the invention, the orientation of the liquid-tight compression fitting can be reversed, such that the compression cap 40 is on the inside of the housing 14 and the fitting retention nut 44 is on the outside. It will also be recognized that liquid-tight compression fittings, having configurations differing from the compression fitting 16 illustrated and described herein, may also be utilized in practicing the invention, in other embodiments of the invention. It will be further recognized, that the invention may be practiced with tank monitoring apparatuses performing functions other than the tank level monitoring function performed by the exemplary embodiment described herein.

All references, including publications, patent applications, and patents cited herein are hereby incorporated by reference to the same extent as if each reference were individually and specifically indicated to be incorporated by reference and were set forth in its entirely herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tank monitor apparatus, having an externally protruding antenna, and comprising:
   a housing including a peripheral wall defining an enclosed interior cavity of the monitor with an antenna opening therein for passage therethrough of the antenna;
   a liquid-tight compression fining attached to the housing at the antenna opening for providing a fluid-tight seal between the antenna and the housing; and
   wherein the compression fitting includes first and second elements thereof forming a threaded connection with one another for applying a compressive force to the antenna, as the first and second elements are threaded together, to thereby retain the antenna in the compression fitting and form the fluid-tight seal.

2. The tank monitor apparatus of claim 1, further comprising the antenna.

3. The tank monitor of claim 1, wherein the compression fitting is attached to the housing by a threaded connection.

4. A tank monitor apparatus, having an externally protruding antenna, and comprising:
   a housing including a peripheral wall defining an enclosed interior cavity of the monitor with an antenna opening therein for passage therethrough of the antenna;
   a liquid-tight compression fining attached to the housing at the antenna opening for providing a fluid-tight seal between the antenna and the housing; and
   wherein the liquid-tight compression fitting comprises:
      a body, a compression cap, and seal insert;
      the seal insert having a through-hole therein adapted for extension therethrough of the antenna and applying a compressive force to the antenna when a compressive force is applied to the seal insert;
      the body having a retention portion thereof attached to the housing, with the body defining a through-bore therein for passage of the antenna therethrough, a section of the through-bore being configured as a seal insert cavity for receiving and retention therein of the seal insert; and
      the body and compression cap being adapted for fixed attachment to one another in a manner applying compressive force to the seal insert, to thereby cause the seal insert to apply a corresponding compressive force to the antenna for retaining the antenna and forming a fluid-tight seal between the antenna and the housing.

5. The tank monitor apparatus of claim 4, further comprising the antenna.

6. The tank monitor apparatus of claim 4, wherein the body and compression cap from a threaded connection with one another for applying a compressive force to the antenna, as the first and second elements are threaded together, to thereby retain the antenna in the compression fitting and form the fluid-tight seal.

7. The tank monitor apparatus of claim 6, further comprising the antenna.

8. The tank monitor apparatus of claim 6, wherein the cap is disposed outside of the interior cavity.

9. The tank monitor apparatus of claim 6, wherein:
   the body of the compression fitting further comprises, a threaded retention section thereof adapted for passage through the antenna hole; and
   the apparatus further comprises a fitting retention nut and a housing seal disposed about the threaded retention section of the body;
   the fitting retention nut being configured for threadably engaging the retention portion of the body and bearing against the housing adjacent the antenna opening for retaining the fitting in the antenna opening and compressing the housing seal between the body of the fitting and the housing, to thereby seal a juncture of the fitting and the housing.

10. The tank monitor apparatus of claim 9, wherein the fitting retention nut is disposed inside of the interior cavity, and the housing seal is disposed outside of the interior cavity.

11. A method for constructing a tank monitor apparatus, the method comprising attaching an externally protruding antenna to a monitor housing including a peripheral wall defining an enclosed interior cavity of the monitor with an antenna opening therein for passage therethrough of the antenna, with a liquid-tight compression fitting attached to the housing at the antenna opening for providing a fluid-tight seal between the antenna and the housing; and
   wherein the liquid-tight compression fitting comprises:
      a body, a compression cap, and seal insert;
      the seal insert having a through-hole therein adapted for extension therethrough of the antenna and applying a compressive force to the antenna when a compressive force is applied to the seal insert;
      the body having a retention portion thereof adapted for attachment to the housing, the body also defining a through-bore therein for passage of the antenna therethrough, a section of the through-bore being configured as a seal insert cavity for receiving and retention therein of the seal insert;
      the body and compression cap being adapted for fixed attachment to one another in a manner applying compressive force to the seal insert, to thereby cause the seal insert to apply a corresponding compressive force to the antenna for retaining the antenna and forming a fluid-tight seal between the antenna and the housing; and the method further comprises:
attaching the body to the housing;
inserting the antenna through the through-hole in the seal insert;
inserting the seal insert into the seal insert cavity in the body; and
attaching the compression cap to the body.

12. The method of claim 11, further comprising attaching the compression fitting to the housing by a threaded connection between the fitting and the housing.

13. The method of claim 11, wherein the body and compression cap form a threaded connection with one another for applying a compressive force to the antenna, as the first and second elements are threaded together, to thereby retain the antenna in the compression fitting and form the fluid-tight seal, and the method further comprises, attaching the compression cap to the body of the compression fitting by threading the compression cap onto the body.

14. The method of claim 13, further comprising, disposing the compression cap is outside of the interior cavity.

15. The method of claim 14, wherein:
the body of the compression fitting further comprises, a threaded retention section thereof adapted for passage through the antenna hole;
the compression fitting apparatus further comprises a fitting retention nut and a housing seal disposed about the threaded retention section of the body;
the fitting retention nut being configured for threadably engaging the retention portion of the body and bearing against the housing adjacent the antenna opening for retaining the fitting in the antenna opening and compressing the housing seal between the body of the fitting and the housing, to thereby seal a juncture of the fitting and the housing; and
the method further comprises retaining the fitting in the antenna opening and compressing the housing seal between the body of the fitting and the housing, to thereby seal a juncture of the fitting and the housing, by threadably engaging the fitting retention nut with the retention portion of the body, and tightening the fitting nut against the housing.

16. The method of claim 15, further comprising, positioning the fitting retention nut is inside of the interior cavity, and positioning the housing seal outside of the interior cavity.

17. A tank monitor apparatus, comprising:
a housing, an externally protruding antenna, and a liquid-tight compression fitting;
the housing including a peripheral wall defining an enclosed interior cavity of the monitor with an antenna opening therein for passage therethrough of the antenna, and
the liquid-tight compression fitting being attached to the housing at the antenna opening for providing a fluid-tight seal between the antenna and the housing;
the compression fitting including a body, a compression cap, and a seal insert;
the seal insert having a through-hole therein adapted for extension therethrough of the antenna and applying a compressive force to the antenna when a compressive force is applied to the seal insert;
the body having a retention portion thereof attached to the housing, the body also defining a through-bore therein for passage of the antenna therethrough, a section of the through-bore being configured as a seal insert cavity for receiving and retention therein of the seal insert;
the body and compression cap being adapted for fixed attachment to one another, with the compression cap disposed outside of the interior cavity, in a manner applying compressive force to the seal insert, to thereby cause the seal insert to apply a corresponding compressive force to the antenna for retaining the antenna and forming a fluid-tight seal between the antenna and the housing.

18. The apparatus of claim 17, wherein:
the body of the compression fining farther comprises, a threaded retention section thereof adapted for passage through the antenna hole;
the tank monitor apparatus further comprises a fitting retention nut and a housing seal disposed about the threaded retention section of the body; and
the fitting retention nut being configured for threadably engaging the retention portion of the body and bearing against the housing adjacent the antenna opening for retaining the fining in the antenna opening and compressing the housing seal between the body of the fitting and the housing, to thereby seal a juncture of the fitting and the housing.

* * * * *